Oct. 26, 1965    M. SNOW    3,214,318
ARTIFICIAL CHRISTMAS TREE
Filed Feb. 27, 1961
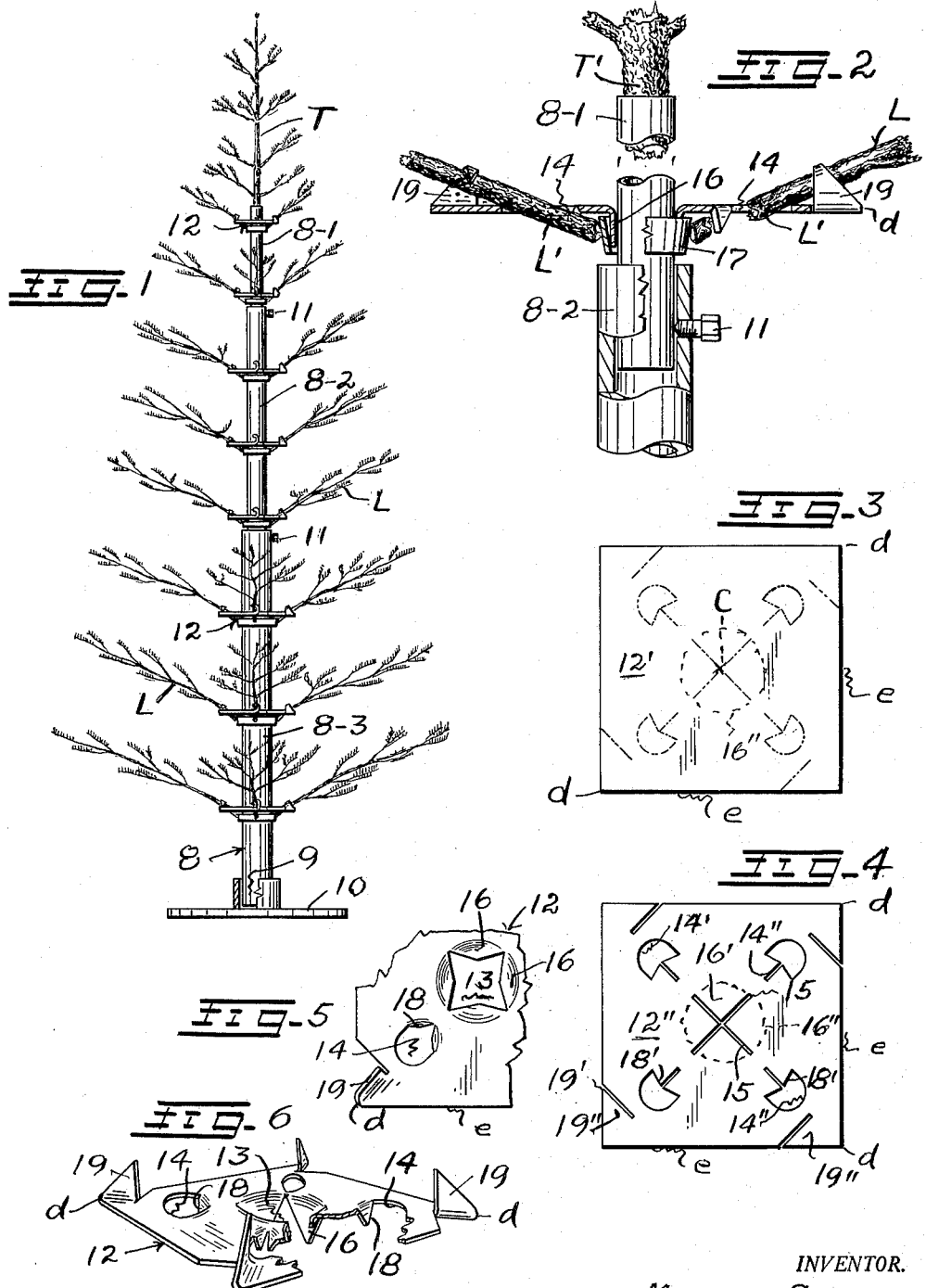
INVENTOR.
MARVIN SNOW
BY Henry N. Young
ATTORNEY

United States Patent Office 3,214,318
Patented Oct. 26, 1965

3,214,318
ARTIFICIAL CHRISTMAS TREE
Marvin Snow, Redwood City, Calif.
(6309 Moeser Lane, El Cerrito, Calif.)
Filed Feb. 27, 1961, Ser. No. 91,883
5 Claims. (Cl. 161—22)

The invention relates to an artificial Christmas tree structure utilizing natural tree limbs.

Recalling that only a small percentage of naturally grown coniferous trees of the varieties normally used as Christmas trees are conically symmetrical enough for attractively mounting lamps and other decorations, whereby many naturally grown trees are not particularly suitable for Christmas-tree or other decorative use, yet are cut and wasted, with a resulting loss of live trees which might otherwise grow to a larger pulp or lumber-providing size, and that excess limbs, or limb portions, are frequently pruned from growing trees to promote the tree growth to utility size and conformation, a present major purpose is to provide a standard which is arranged for use as an artificial tree trunk in building up artificial tree assemblies of desirable outline by utilizing the aforesaid excess tree limbs which might otherwise be discarded as useless.

Another object is to provide an artificial tree trunk of a sectional structure which is arranged for its compact packaging when not in use.

A further object is to provide an artificial tree trunk of the character described having elements which are engageable by natural tree limbs to provide tree assemblies of various desirable height and breadth proportions as may be desired.

An added object is to provide for a readily adjusted mounting of the limb-supporting elements on and along the trunk sections.

A more specific object is to provide an artificial tree trunk of the character described utilizing particularly simple and effective one-piece limb-supporting elements along its assembly.

The invention possesses other objects and features of advantage, some of which, with the foregoing, will be set forth or be apparent in the following description of a typical embodiment thereof, and in the accompanying drawings, in which:

FIGURE 1 is an elevation of an artificial tree assembly embodying the features of present invention.

FIGURE 2 is a broken-away and partly sectional view of the tree structure at a juncture of trunk sections thereof.

FIGURE 3 is a face view of a marked flat blank for providing a limb-supporting element of the present tree assembly.

FIGURE 4 is a face view of the stamped-out flat blank of FIGURE 3.

FIGURE 5 is an enlarged fragmentary plan view of the limb-supporting element.

FIGURE 6 is a broken-away perspective view of the limb-supporting element as formed from the blank of FIGURE 3.

Essentially, a present artificial tree assembly comprises a central standard 8 consisting of a plurality of aligned and telescopically engaged tubular and open-ended sections having different uniform diameters progressively increasing downwardly, and telescopically engageable in their order to cooperatively provide an upwardly tapering standard comprising a trunk of adjusted height. The particularly illustrated three-part trunk assembly 8 comprises top and intermediate and bottom trunk sections 8–1 and 8–2 and 8–3 respectively, with the lower end of the bottom trunk section 8–3 fittedly engageable in a complementary socket 9 extending transversely from a base plate 10 arranged for supporting the assembled trunk on a suitable support surface in upright position. The tubular sections of a trunk 8 may be of any suitable material, such as cardboard and/or plastic and/or metal compositions, and mutually engaged sections may be releasably held in longitudinally adjusted relation in an appropriate manner, as by set-screws 11 engaged in and through outer sections 8–2 or 8–3 at an upper end portion thereof to holdingly engage the received section 8–1 or 8–2 respectively at opposed points thereof.

Limb-supporting elements 12 are provided for mounting separate assemblies of limbs L at adjusted heights along the assembled trunk 8, and each present element 12 is arranged for its shaping from an originally flat and imperforate blank member 12' (FIGURE 3) which may be die-cut to provide a prepared blank 12" (FIGURE 4) having a trunk-receiving central interior opening 13 and limb-receiving openings 14 therethrough in preferably symmetrical arrangement about its opening 13.

A present support element 12 is arranged to utilize the openings 14 about its opening 13 for the downwardly-directed diagonal insertion therethrough of leaf-free butt end portions L' of tree limbs L for a cantilever support of the extending leaf-carrying portion of the limb in a gripped positioning relation to the trunk-mounted element, whereby the inserted inner limb end portion is then disposed below the element with its free extremity adjacent the trunk section which mounts the element and limb. Also, as indicated in FIGURES 1 and 2, a tree-tip member T, or the outer end portion of a limb which has been trimmed to more or less resemble a tree tip, may be supported on the upper trunk section by having its butt end T' fittedly inserted in the top opening of the uppermost trunk section for completing an artificial tree assembly, the elements 12 being of similar formation, but of different dimensions for their mounting on the different-sized sections of a trunk assembly 8.

It will now be noted that a present support element 12 is arranged for its provision by successively die-cutting and die-shaping the square and originally flat member 12" (FIGURE 4) of appropriately bendable metallic or plastic or other suitable sheet material which is formable to provide the relatively rigid and appropriately shaped element 12 having corners $d$ defined at the intersection of straight side edges $e$ peripherally bounding the formed element. Preferably, and as indicated in FIGURE 4, interior slots 15 extend for like distances from the geometrical center point C of the present square flat blank 12" to define mutually radiating portions 16' which are sector-shaped in reference to a continuous circular line 16" concentric with the center C and connecting the slot extremities; while the slots 15 which bound the portions 16' of a present unshaped element blank 12" are shown as extending from the center C toward the element corners $d$, it will be understood that the extension of the slots 15 in perpendicular relation to the element edges $e$ would provide a formed element 12 of maximum transverse stiffness. To provide for a fixed mounting of an element 12 on a trunk section with which it is to be used, a downward bending of the blank portions 16' from the line 16" into generally perpendicular relation to the original plane of the blank provides the trunk-receiving opening 13 which is defined by the circular line 16" from which the displaced blank portions 16' depend as triangular tongues 16 which are cylindrically curved longitudinally thereof.

In a present assembly, a support element 12 is arranged to be supportedly and releasably fixed to a trunk section of appropriate size engaged through its opening 13 by reason of the simultaneously wedged engagement of the tongues 16 thereof between the cylindrical exterior of the received trunk section and the downwardly-tapered bore of a continuous collar member 17 which freely but closely receives the trunk section at its smaller end, with collar members 17 of appropriately different sizes being provided for mounting corresponding elements 12 on the trunk sections of different size; as particularly shown, the trunk sections 8–1 and 8–2 and 8–3 respectively mount two and three and three corresponding elements 12 in desired mutually spaced arrangement along the trunk assembly. While the present use of a collar 17 provides for a particularly ready release of a member 12 from a mounting trunk section by forcing an element 12 axially from the collar which mounts it, it will be understood that the tongues 16 might be supportedly and directly fixed to a trunk section of appropriate size engaged through the element opening 13, as by a suitable pin or screw or nail means (not shown) engaged through a tongue 16 and in the opposed trunk section.

For use in a positioned securing of limbs thereat, a present trunk-mounted element 12 is provided therethrough and outwardly of the edge line 16" of its opening 13 with four of the limb-receiving openings 14 in diagonal lines joining the blank corners $d$ and passing through the blank center C. A present opening 14 is provided by punching from the blank 12' like-shaped holes 14' having the outlines indicated and illustrated in FIGURES 3 and 4 respectively and generally comprising larger outer and generally fan-shaped portions beyond relatively narrow and uniform slot portions extending outwardly thereto in said diagonal lines, whereby a hole 14' is of symmetrical form with respect to said lines. More specifically, a blank hole 14' has a semi-circular outer edge line portion from the ends of which mutually parallel straight edge portions extend tangentially to the arc of the line in mutually parallel relation to an intersection thereof with angularly related straight edge portions which extend to the outer ends of the different side edges of a slot portion 14" of the hole to define triangular portions 18' of the blank between the latter edge portions and having acute-angled points.

It will now be noted that the downward bending of the triangular portions 18' of a formed blank 12' into generally perpendicular relation to the original plane of the blank-providing piece 12" provides prongs 18 having mutually opposed edges intersecting at the outer ends of the blank slots 14" and arranged to wedgedly and laterally engage between them limb-butt ends L' extending obliquely downwardly through the opening 14 of the trunk-receiving element opening 13 radially thereof. The arrangement is essentially such that a firm engagement of an inserted limb portion L' with said edges of the prongs 18 is operative to engage and secure the limb portion against rotative and longitudinal dislodgement from its set position while a cantilever support is provided for a mounted limb which has had its butt end portion inserted freely through the hole 14 prior to a lowering of the extending limb portion to rest upon the element at and beyond the outer edge of the hole 14 which receives the limb in the diagonal line of the element.

Understanding that the raising of the extending portion of a limb carried by an element 12 may release the limb for its dismounting, a means is preferably provided for preventing an accidental raising of a mounted limb to permit its dismounting, and said means essentially comprises the provision by the element 12 of retaining tongues 19 arranged for such a releasable engagement thereof with a mounted limb as to prevent an accidental release or dismounting of the limb from the element. Accordingly, an element blank 12' is formed at its corners $d$ to provide tongues 19 corresponding to the different element openings 14 for suitably engaging the butt portions L' of a mounted limb L to prevent a releasing lifting of the limb. As shown, straight slots 19' provided in the blank 12' extend obliquely from the different blank edges $e$ to points in or adjacent the blank diagonals between the openings 14 and the blank corners $d$ whereby to define triangular blank portions 19" between them and the corresponding blank edge portions extending from said slots to the corresponding corners, the arrangement being essentially such that the tip parts of the portions 19" are bendable around a limb installed through the corresponding opening 14 for securing the limb thereat against the element 12, as indicated in FIGURE 2.

By particular reference to FIGURES 2 and 5, it now will be generally noted that a present limb-supoprting element 12 essentially comprises a generally flat body portion of regular polygonal outline providing the depending element-mounting tongues 16 about a central opening 13, the depending limb-gripping pairs of prongs 18 at the inner sides of the limb-receiving openings 14, and the upwardly directed tongues 19 outwardly of the openings 14 and releasably applicable about element-carried limbs in such manners as to normally prevent their rotative or longitudinal dislodgement from their gripped engagement with the element. While I have particularly disclosed an arrangement in which natural tree limbs L are utilized in a tree assembly, it will be understood that the present arrangement permits the optional mounting of metallic and/or non-metallic artificial tree limbs on or with respect to the limb-supporting elements 12.

Understanding that the preparation of an element 12 from a blank 12' for its mounting and use on a trunk section includes the downward bending of the sector portions 16' and the blank portions 18' from the openings 14 and the upward bending of the parts 19', it will be further understood that slits may be provided in the blank 12' in lieu of the slots 15 or 14" or 19 which have their sides define edges of the tongues 16 and/or prongs 18 and/or tongues 19, respectively. It is also to be recalled that a built-up trunk 8 for mounting elements 12 comprises sections which are telescopically assembled in the described manner, and that the different sections may each mount one or more like elements 12 fitting them for supporting natural limbs from one or more of the limb-receiving openings 14 thereof in accordance with a desired spacing of limbs along a present trunk having its relatively adjustable sections cooperatively providing the trunk of desired overall height.

From the foregoing description taken in connection with the accompanying drawings, the advantages of the present artificial Christmas tree will be readily understood by those skilled in the art to which the invention appertains. While I have shown and described a structure and utility arrangement which I now consider to comprise a preferred embodiment of my invention, I desire to have it understood that the showings are primarily illustrative, and that such changes and developments may be made, when desired, as fall within the scope of the following claims.

I claim:

1. In a simulated natural tree structure, a built-up standard extending from a support base and comprising a succession of telescopically engaged and connected tubular sections having progressively smaller uniform annular cross-sections upwardly of the standard whereby the standard assembly tapers upwardly to the section of smallest cross-section, a means for releasably and mutually securing said telescopically engaged standard sections in different longitudinally adjusted relations for providing a standard assembly having an adjusted height with the sections variably related in the assembly, a limb-support element for mounting on the externally exposed portion of a received standard section and providing an interior opening of corresponding effective size for adjustably receiving a standard section, a split collar portion of said element providing tongues coaxial with said opening, and a means cooperative between a said collar and the portion of the standard section received therethrough for mounting the element on the standard in a longitudinally adjusted relation thereto.

2. The structure of claim 1 in which the collar part of the limb-support element provides a series of mutually independent tongues extending similarly and axially from the central opening of the element, and the means fixing the element to the received standard section comprises a conically tapered sleeve member wedgedly receiving the tongues of the element collar portion between the standard exterior and the bore of the sleeve.

3. In a simulated tree structure, a standard comprising an artificial tree trunk rising rigidly from a support base and having a limb-support of uniform circular cross-section, limbs for mounting on the standard in radially extending relation thereto, a unitary limb-supporting element for mounting on said standard portion and having a generally planar part providing a transverse central opening for receiving said standard portion, a means cooperative between the exterior of said standard portion and said element for fixing the element to the received portion of the standard in longitudinally adjusted relation thereto, transverse limb-receiving openings in said planar part of the element for diagonally and freely receiving the butt portions of the limbs to provide thereat a cantilever support of the engaged limbs by the element from the edge points of the latter openings furthest from the central opening and depending tongue pairs which are provided at the inner sides of said limb-receiving openings of the element and have mutually diverging edges for non-rotatively engaging the mountedly received limbs with and between them.

4. In a simulated tree structure, a standard comprising an artificial tree trunk rising rigidly from a support base and having a limb-support of uniform circular cross-section, limbs for mounting on the standard in radially extending relation thereto, a unitary limb-supporting element for mounting on said standard portion and having a generally planar part providing a transverse central opening for receiving said standard portion, a means cooperative between the exterior of said standard portion and said element for fixing the element to the received portion of the standard in longitudinally adjusted relation thereto, transverse limb-receiving openings in said planar part of the element for diagonally and freely receiving the butt portions of the limbs to provide thereat a cantilever support of the engaged limbs by the element from the edge points of the latter openings furthest from the central opening and upwardly extending prongs which are provided outwardly of said limb-receiving openings of the limb-supporting part of the element and are engageable with a mounted limb for preventing its dismounting disengagement from the fulcruming edge of the opening receiving it.

5. In a simulated tree structure, a standard comprising an artificial tree trunk rising rigidly from a support base and having a limb-support of uniform circular cross-section, limbs for mounting on the standard in radially extending relation thereto, a unitary limb-supporting element for mounting on said standard portion and having a generally planar part providing a transverse central opening for receiving said standard portion, a means cooperative between the exterior of said standard portion and said element for fixing the element to the received portion of the standard in longitudinally adjusted relation thereto, transverse limb-receiving openings in said planar part of the element for diagonally and freely receiving the butt portions of the limbs to provide thereat a cantilever support of the engaged limbs by the element from the edge points of the latter openings furthest from the central opening, a collar part of said element which depends from the standard-receiving opening of the element, depending tongue pairs which are provided at the inner sides of the limb-receiving openings of the element for cooperatively engaging the mountedly received limbs against longitudinal removal or rotation, and upwardly extending prongs which are provided beyond the limb-receiving openings of the limb-supporting part of the element for cooperative engagement with a mounted limb to prevent its accidental upward disengagement from the edge of the element opening receiving it.

References Cited by the Examiner
UNITED STATES PATENTS

| | | | |
|---|---|---|---|
| 891,301 | 6/08 | Spreen | 41—15 |
| 1,555,621 | 9/25 | Barker | 41—15 |
| 2,186,351 | 1/40 | Stojaneck | 41—15 |
| 2,778,136 | 1/57 | Belgard | 41—10 XR |
| 3,115,435 | 12/63 | Abramson | 161—24 |
| 3,131,112 | 4/64 | Abramson | 161—24 |

ALEXANDER WYMAN, *Primary Examiner.*

EARL M. BERGERT, CARL F. KRAFFT, *Examiners.*